(12) United States Patent　(10) Patent No.: US 6,567,825 B2
Bogia　(45) Date of Patent: May 20, 2003

(54) SYSTEM AND METHOD FOR PROCESSING A WORKING FILE

(75) Inventor: Douglas P. Bogia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/376,722

(22) Filed: Aug. 17, 1999

(65) Prior Publication Data

US 2002/0091662 A1 Jul. 11, 2002

(51) Int. Cl.⁷ .............................................. G06F 12/00
(52) U.S. Cl. ........................ 707/200; 345/762; 345/764
(58) Field of Search ................................. 345/339, 348, 345/333, 352, 762, 764; 707/200, 205

(56) References Cited

U.S. PATENT DOCUMENTS 5,737,557 A * 4/1998 Sulivan ...................... 345/340
5,832,471 A * 11/1998 Fukui ............................ 707/1
6,012,068 A * 1/2000 Boezeman et al. ......... 707/104

OTHER PUBLICATIONS

Moseley et al. "Mastering Microsoft Office 97, Professional Edition" Second edition; SYBEX Inc. 1997, Chapter 2, pp. 15–29.*

"Photoimpact 4 User Guide" Ulead System Inc. Aug. 1998, Chapter 1–2, p. 9–66 and Chapter 8, pp. 217–262.*

* cited by examiner

Primary Examiner—Jean R. Homere
Assistant Examiner—Khanh Pham
(74) Attorney, Agent, or Firm—Kenyon & Kenyon

(57) ABSTRACT

A file sharing system using working files is implemented in a computer system having a memory system. The working file is provided by a working file application to various applications in the computer system, via a process that is transparent to the user. The working file application may provide a user interface to allow the user to select applications to execute, and to designate certain files as the working file. The applications may comprise a "suite" of applications for related subject matter.

46 Claims, 12 Drawing Sheets

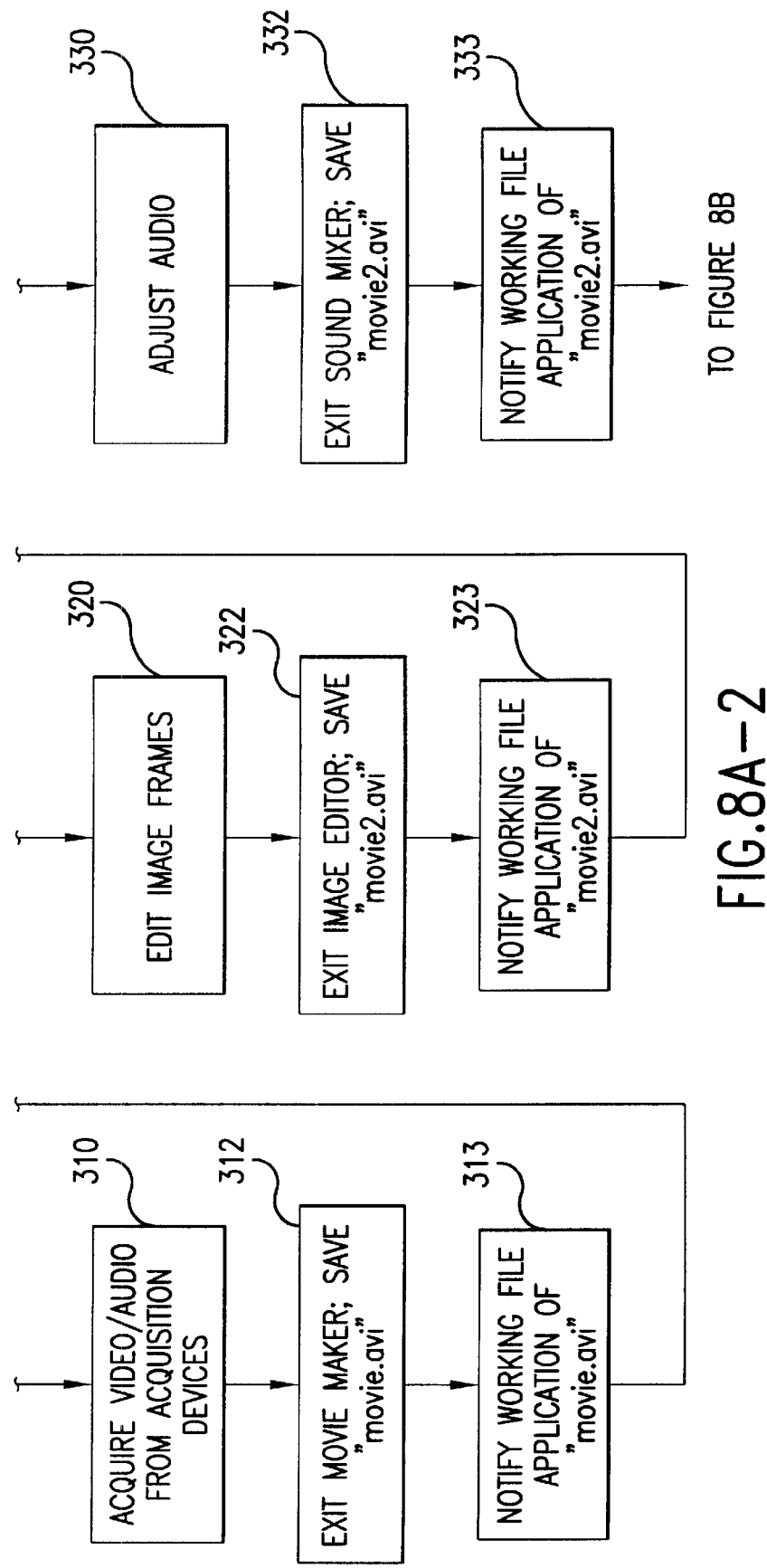

SYSTEM AND METHOD FOR PROCESSING A WORKING FILE

BACKGROUND INFORMATION

In present computer system environments, users are presented a number of software applications that may be available on a computer workstation or over a network. Typical software applications may be, for example, word processing software, spreadsheet software, drafting and multimedia design applications, internet browsing software, and so forth. Several software providers have provided collections of application programs that have related functionality. Examples of such application "suites" are the "Create and Share Pack" from Intel Corporation (multimedia) and the "Microsoft Office" suite from Microsoft Corporation (business document processing).

Software applications generally allow a user to create and perform work on "data files" which may be stored in a memory system of some sort used with the computer system (e.g., integrated circuits, optical or magnetic storage disks or network servers). The user may execute the application software (e.g., a word processor) and then, via an "open file" feature of the application, load and edit the data file (e.g., a document file). Typically, the particular application is configured to look for such data files in a specific "default" location in the memory system associated with the application (e.g., a particular folder or directory). The user may typically alter this default, or may enter another specific location from which to retrieve a desired data file, if that location is known to the user. Difficulties have been encountered in dealing with data files stored in a memory system.

If a data file is not located in the default location for a particular application, the file may not be automatically retrieved by the application when requested by the user. Even if the data file is in the default location for one application, other applications may use different default locations, and therefore the data file may not be in the default location for other applications. Furthermore, the data file may not be visible to the user via an application's "open file" feature, either because it does not have the correct file type extension for use by the application, or is not in a directory that is immediately apparent from the user interface provided with the application's "open file" feature. In order to use the data file in such a situation, the user must know the file type and exact location of the data file in the directory structure of the memory system. Where there are numerous data files in the memory system (and numerous locations where such data files may be stored), recording the exact locations of such files becomes time consuming and inefficient to the user.

The difficulty in locating data files is accentuated when using application suites, as the same data file may be desired for use across multiple applications in the suite. For each application, the user may be required to remember the exact location and file type of the data file, and then use each application's "open file" feature to retrieve the desired data file. This file-finding process becomes tedious and inefficient, particularly where several applications in the suite are to be used to perform work on the same data file.

One method used to overcome these difficulties has been to use a "search" or "find" command, which performs a search of the memory system for the location of the data file. However, in large memory systems (for example, networks), such searching may be time consuming and a drain on system resources. Some applications have also attempted to overcome this data file locating problem by "remembering" a list of data files that have been recently worked on using the application. The user could then select one of the data files from the list of recently used data files, and the application would retrieve the desired data file from its location in the memory system. This data file "remember" feature, however, does not provide indications to other applications in an application suite of the location of the recently used data file, and therefore the location of the data file must still be provided by the user when subsequently using other applications to operate on the data file.

SUMMARY OF THE INVENTION

A system according to the present invention comprises a working file stored at a location in a memory system and having a path to the location in the memory system and a working file application. The working file application includes a user interface providing accessibility to a number of applications. The working file application provides the path of the working file to a selected one of the number of applications.

A method for file sharing according to the present invention comprises providing a user interface that includes a number of application indicators, each of the application indicators related to one of a number of applications, and a working file identifier related to a working file; receiving a selection of one of the number of applications; retrieving a path of the working file; and providing the path of the working to the one of the number of applications that is selected.

DETAILED DESCRIPTION

Figure 1:
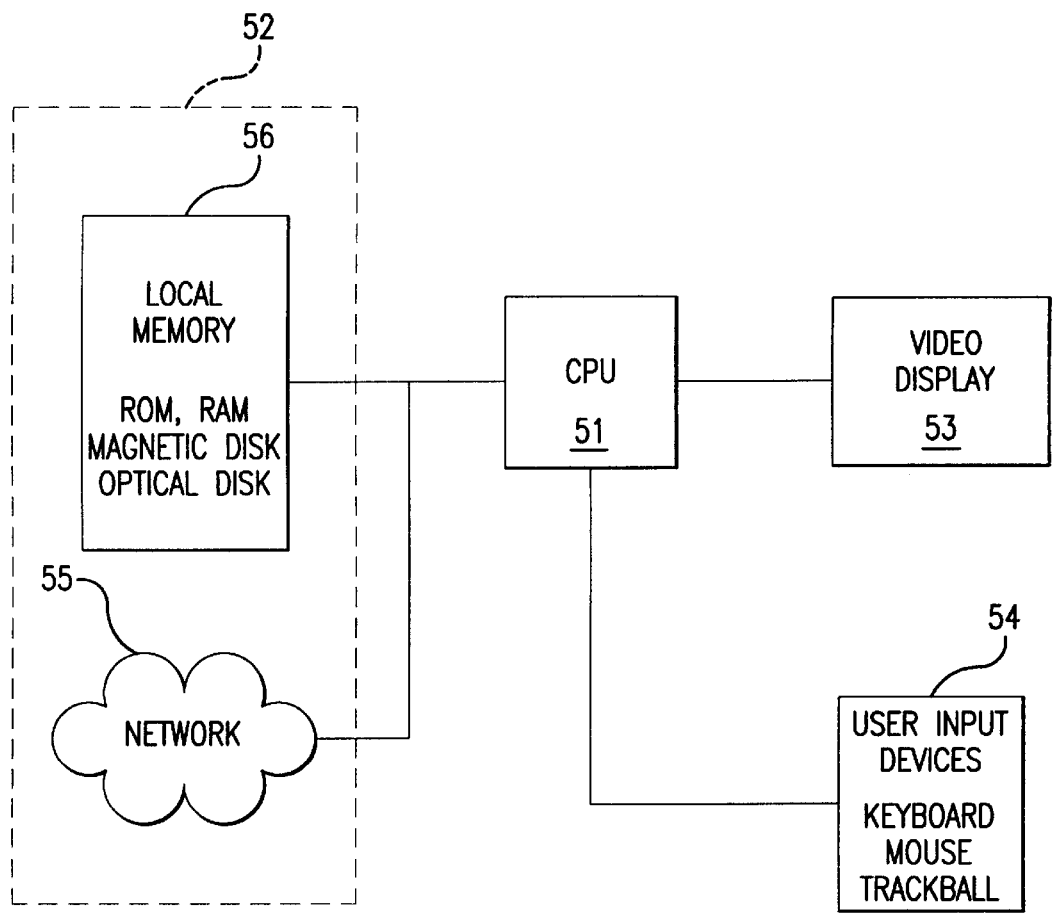
FIG. 1 shows a block diagram of a computer system to implement a first exemplary file sharing system according to the present invention.

FIGS. 1–5 illustrate a first exemplary embodiment of a file sharing system using working files according to the present invention. FIG. 1 depicts an exemplary computer system that may be used to implement the exemplary file sharing system. Computer system 50 includes a CPU 51 that is connected to a memory system 52, a video display 53 and user input devices 54. Connection between these elements may be made in a manner otherwise well known in the art. The CPU 51 comprises the processing elements of the computer system 50, and may include a microprocessor, as is well known. The operation of CPU 51 may be controlled by an operating system (e.g., Unix, MS-DOS, Microsoft Windows or NT) that controls, for example, the execution of programs and program access to the memory system 52. The memory system 52 may include a local memory 56 that may comprise one or more of the different well known types of memory equipment, such as integrated circuits (ROM, RAM), magnetic disks (hard disks, floppy disks), and optical disks (CD-ROM, CD-R). Memory system 52 may also provide memory storage via connection to a network 55 (LAN, WAN). The video display 53 likewise may encompass various types of well known display devices (CRT, LCD). The user input devices 54 may include, for example, one or more of the following well known devices: a keyboard, a mouse, a trackball, a pen.

The exemplary file sharing system is initiated by loading and executing from the memory system 52 a "working file application" (which may be written in any known computer language, Visual C++ being an example). The working file application presents a user interface that allows a user to designate a data file as a "working file." The exact location where the working file is stored in the memory system 52 (sometimes referred to as its "path") is stored by the working file application. The working file application also exposes interfaces (via the user interface) to a number of applications (i.e., one or more applications), for example, the applications of an application suite. These interfaces may be accomplished, for example, by providing graphical indicators in the user interface representing each application, and by associating with the graphical indicators an execution statement that, when provided, for example, to the operating system, will cause the represented application to be executed. When the user selects a graphical indicator in the user interface, the working file application initiates the execution of the selected application (for example, using the execution statement), and provides the path of the working file to the selected application.

Figure 2:
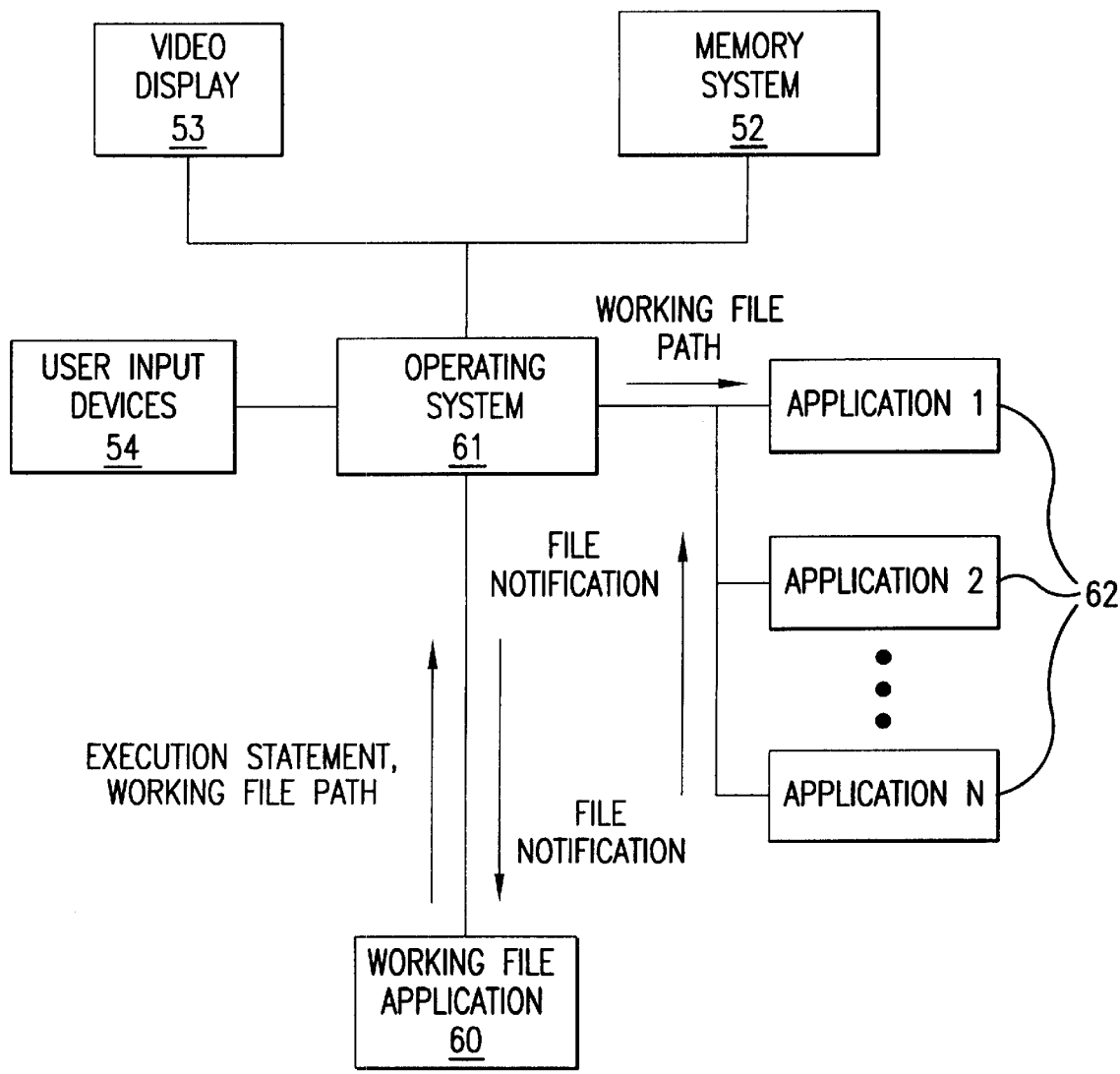
FIG. 2 shows a logical block diagram of the computer system of FIG. 1, according to the present invention.

FIG. 2 shows a block diagram of the logical connections between the working file application 60 and various elements of the computer system 50. Working file application 60 is linked to the various system resources via the operating system 61, which, as mentioned above, may comprise one of the many well known operating systems available (e.g., Unix, MS-DOS, Windows). The operating system 61 provides control and access to the various system resources connected to the CPU 51: the memory system 52, the video display 53, and the user input devices 54. Furthermore, the operating system 61 provides facilities to execute at least one of a number of applications 62 that are available to the computer system 50 (e.g., by virtue of their presence in the memory system 52). For example, a user may be able to enter an execution statement into operating system 61 that causes a particular application 62 to execute. The operating system 61 may also provide a facility to provide parameters to applications 62 (for example, via a command line argument parameter passing function). Working file application 60 may operate (as further described below) by sending an execution statement to the operating system 61 to begin execution of a particular application 62, as well as providing the path of the working file to the application 62 via the parameter passing facility of the operating system 61 or some other notification method. Working file application 60 may further operate to receive the path of a working file from an application 62 via the parameter passing facility of the operating system 61, or some other notification/messaging method.

Figure 3:
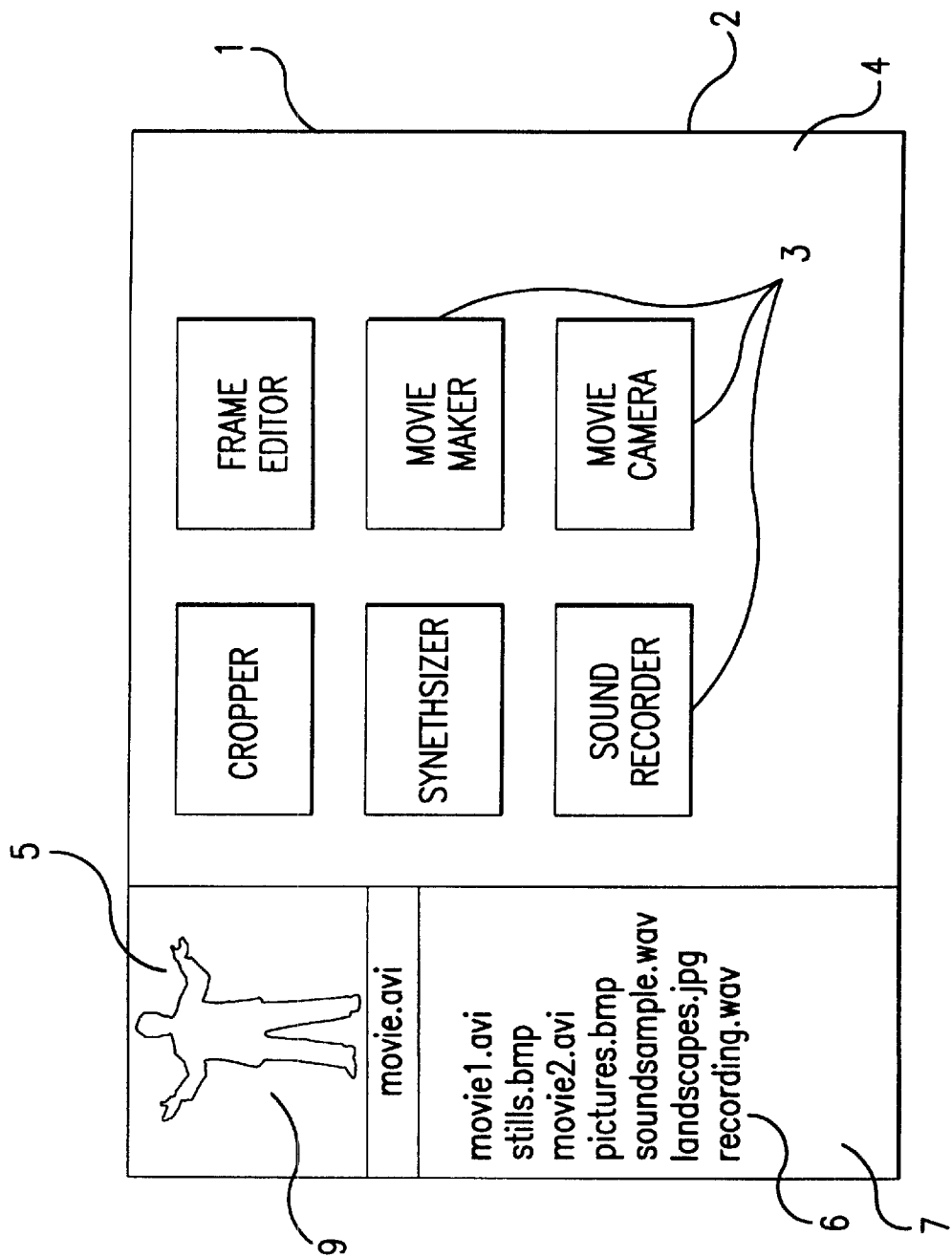
FIG. 3 shows a first illustration of a user interface of the first exemplary file sharing system according to the present invention.

FIG. 3 depicts a video screen 1 of the video display 53 displaying an exemplary user interface 2 provided by the working file application 60. User interface 2 may encompass a portion of the video screen 1. The user interface 2 allows users to access a suite or other collection of software applications, typically related in general application (e.g., multimedia applications or business document processing applications). The applications 62 may be represented in the user interface by graphical indicators 3 (for example buttons, icons, text) in order to allow the user to select the desired application for access (e.g., execution). As shown in FIG. 3, the applications 62 are indicated by graphical indicators 3 which are icons that indicate the name of the application, although other indicators are possible. The indicators 3 are located in an application window 4 of the user interface 2.

The user interface 2 also includes a working file window 5 that displays a file identifier 9 for the working file. The working file represents a data file (e.g., a text document, bitmapped graphic, sampled audio, etc.) that may be operated on by at least one of the applications represented by indicators 3 in the application window. The working file application maintains the exact storage location of the working file in the memory system (its "path"), such that the user need not know its location in order to perform operations on this file. The file identifier 9 may be the name, first page or other identifying feature for the data file that is the working file. The user interface 2 may further include a file library 6, displayed in a file library window 7. The file library 6 includes a number of data files for which the user interface 2 has maintained paths (e.g., recently used files). Each data file in the file library 6 may be represented in the file library window 7 by its own file identifier 9. Should the user want to operate on the working file using a particular application 62 represented in the application window 4, the user may initiate this operation in a number of ways. The user may simply select the desired application from the user interface 2, for example, by using the user input devices 54 (e.g., the mouse) to select the appropriate indicator 3. The working file application 60 recognizes the selection of the application, and executes the application, for example, by sending the execution statement for the application to the operating system and passing the path of the working file via the parameter passing facilities of the operating system. Alternatively, the user may select the working file by using the user input devices 54 to select the working file identifier 9 and then to "drag" the working file identifier 9 to the desired application indicator 3. The working file application 60 will interpret this action as desiring to operate on the working file using the application, and will accordingly execute the application, passing the path of the working file to the application.

Figure 4:
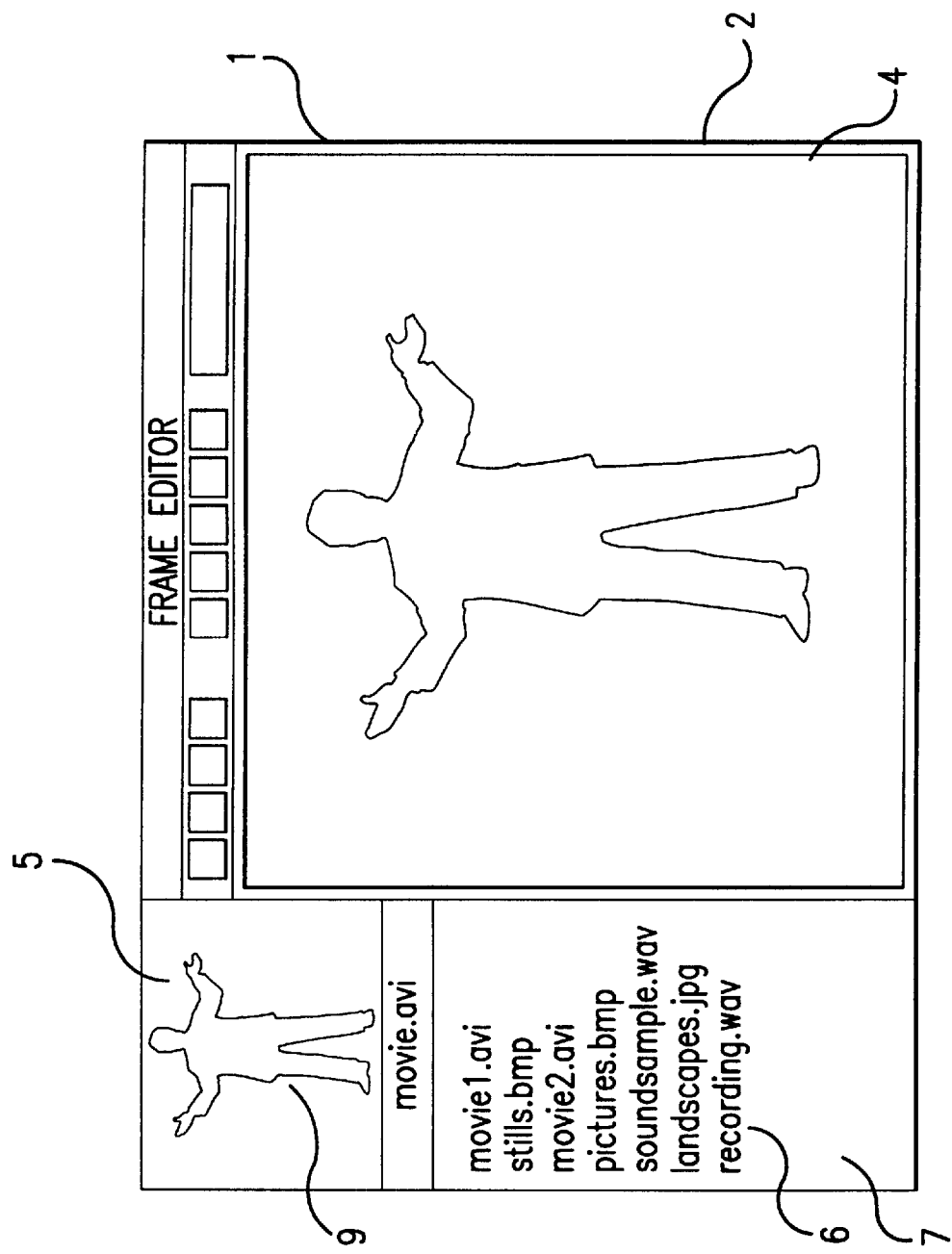
FIG. 4 shows a second diagram of the user interface of the first exemplary file sharing system according to the present invention.

Furthermore, as shown in FIG. 4, the executed application may be run over the application window 4 of the user interface 2, such that the working file window 5 and the file library window 7 are still visible on the video screen 1, but the graphical indicators 3 are no longer visible.

A data file displayed in the file library window 7 may be made into the working file by selecting the desired file using the user input devices 54 (e.g., the mouse). Once the data file is selected, its file identifier 9 is displayed in the working file window 5, and the path to the data file is retrieved by the working file application 60 for use with any desired applications 62 represented in the user interface 2. The user may alternatively bypass the steps above by selecting the data file from the file library window 7 and "dragging" the file identifier 9 for the data file to the application indicator 3 that the user desires to use to operate on the selected data file. The working file application 60 will interpret from this action that the user would like the selected data file to become the new working file, and will execute the selected application using the selected data file as the new working file.

Figure 5:
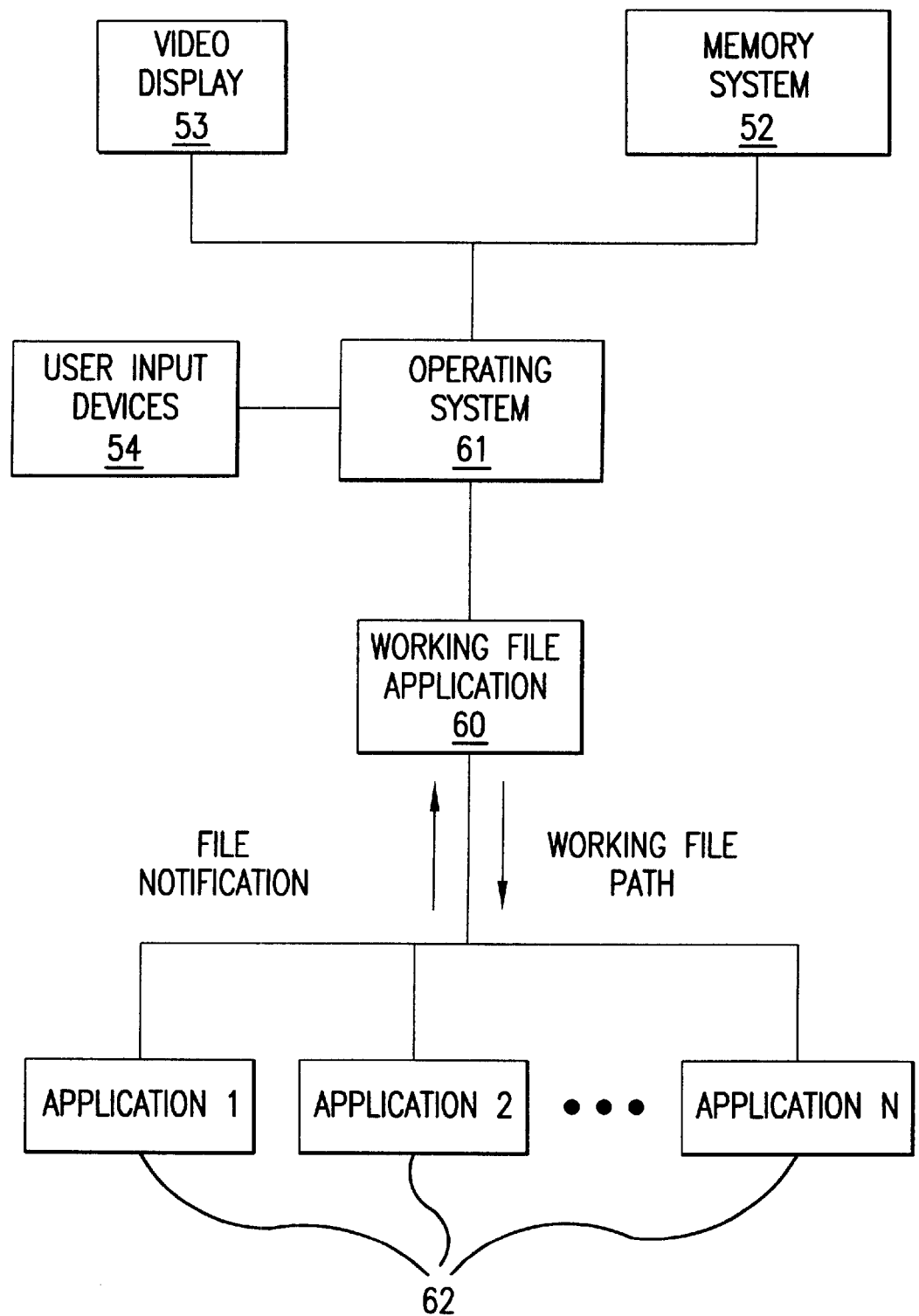
FIG. 5 shows a logical block diagram of a second configuration of the computer system of FIG. 1, according to the present invention.

Upon starting the working file application 60, the last data file that was being operated on by one of the applications 62 represented in the application window 4 may be set as the working file, and the user interface 2 will display the file identifier 9 for that data file in the working file window 5. Thus, the user interface 2 may immediately provide the user with the most likely data file that may be desired for operation.

Where the working file application is integrated as part of a suite of applications, executing the applications and passing the path of the working file may be implemented by known programming methods (e.g., stacks, pointers, etc.), without the use of any specific facilities of the operating system. FIG. 5 illustrates this logical connection. Where the working file application is implemented as a separate program from the applications themselves (as shown in FIG. 2), the working file application may achieve execution of applications and passing of the path of the working file via the known programming methods mentioned previously and/or via well known parameter passing facilities of the operating system during the execution of the application (e.g., command line arguments, messaging, etc.). Also, the working file application may include various "viewers" corresponding to the applications represented in the user interface in order to display a miniature graphical view of the first data "page" of the working file in the working file window. Such viewers are well known in the art.

Additional features may be supported by the working file application. For example, the working file may be incompatible with some of the applications represented in the user interface (for example, where a sound file is the working file, it may not be operated on by a video editor). In such a case, the working file application may indicate the incompatibility in the user interface 2 via a "signal" indicating the incompatibility: by shading the indicators 3 for applications that are incompatible, by placing an "X" over the indicators 3 for such applications, or by some other graphic. The working file application will then not allow the use of such applications with the working file. The working file application may also include a feature to allow the user to add or delete applications accessible via the user interface in order to customize the working file application for the particular needs of the user. The working file application may thereby provide a control feature for the user to specify the execution statement, the graphical indicator, compatible file types and other interoperability requirements for the application to be added. The working file application may also include a "drag tips" feature that provides "pop up" text when, for example, the working file identifier 9 is dragged over an application indicator 3. Such pop up text may provide, for example, a description of the functions provided by the application related to the application indicator 3.

Figure 6:
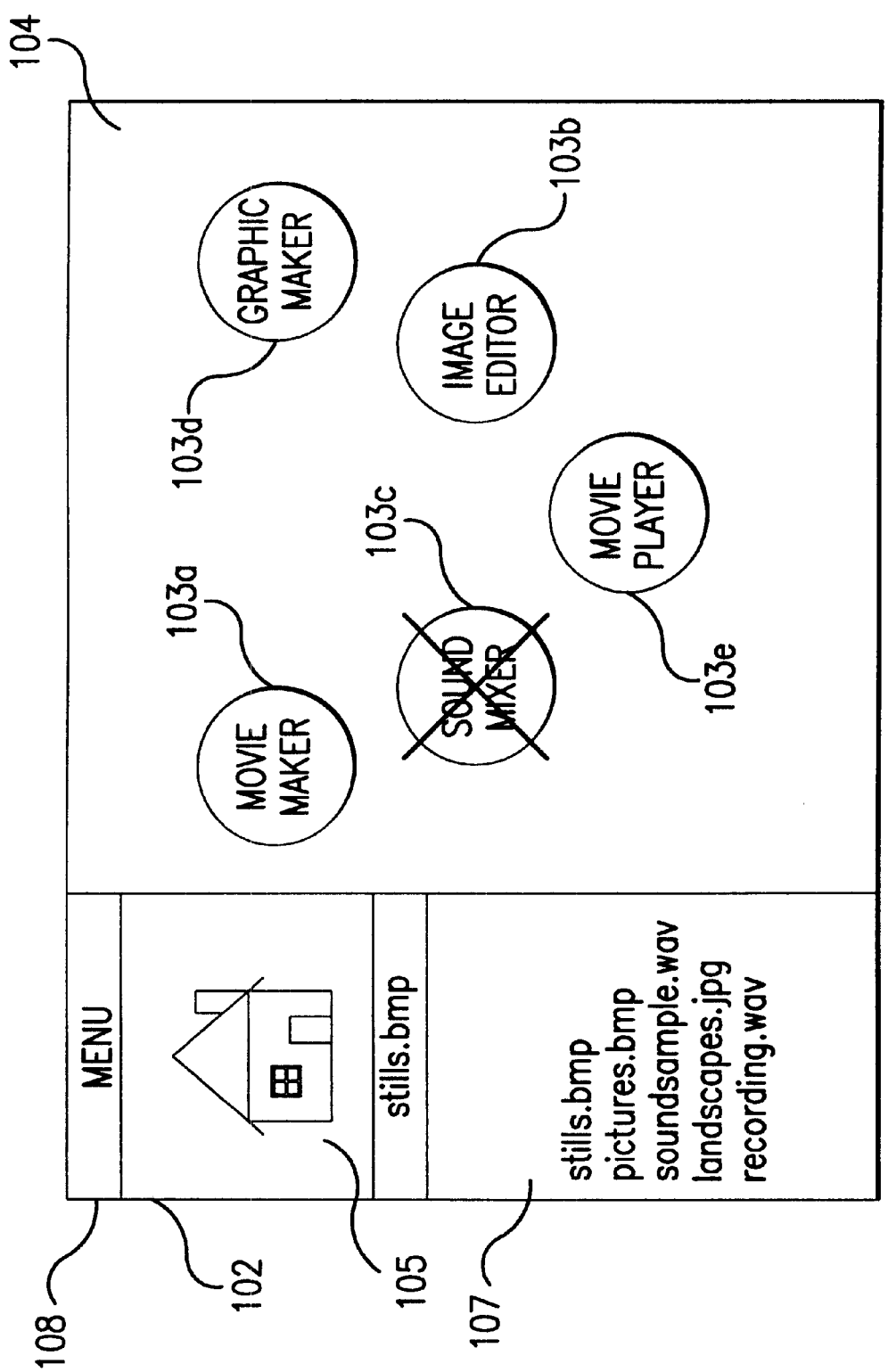
FIG. 6 shows a first diagram of a user interface of a second exemplary working file application according to the present invention.

FIGS. 6–9 illustrate a second exemplary embodiment of a file sharing system according to the present invention. This second embodiment is tailored to the specific functionality of a particular set of applications, in this case a suite of multimedia processing tools. As shown in FIG. 6, user interface 102 provided by working file application includes a number of application indicators 103 in an application area 104. User interface 102 is directed to a multimedia application suite, for example, the "Create and Share Pack" application suite from Intel Corporation. As such, the applications linked to user interface 102 are directed to creating and manipulating multimedia data files: movie maker 103a, image editor 103b, sound mixer 103c, graphics creator 103d and movie player 103e. User interface 102 also includes a working file window 105 and a gallery window 107 to display a file gallery, and may further include a menu bar 108 to provide access to control features of the working file application.

Figure 7:
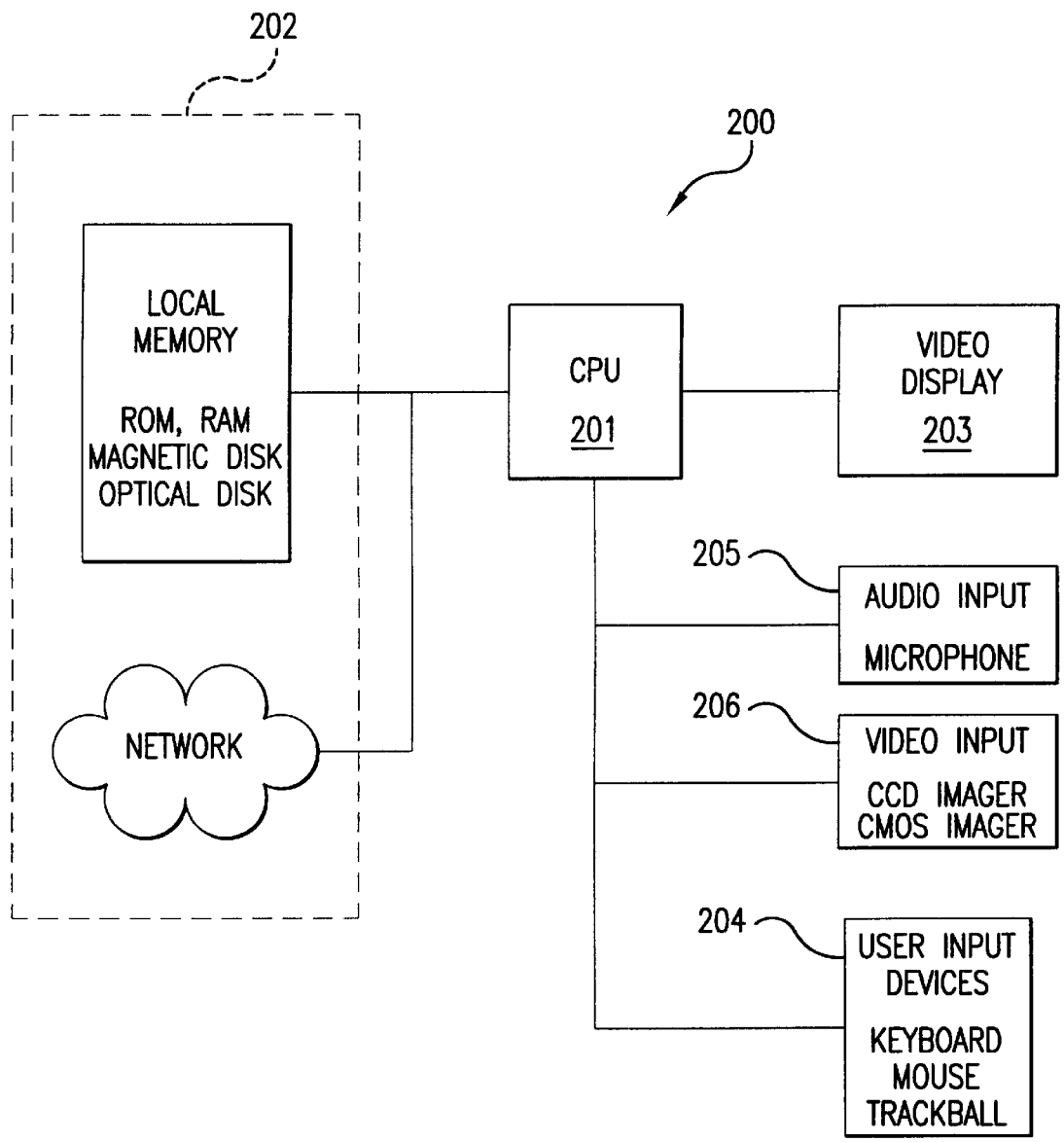
FIG. 7 shows a block diagram of a computer system for use with the second exemplary file sharing system, according to the present invention.

FIG. 7 illustrates a computer system 200 equipped for use with the second exemplary file sharing system. CPU 201 is connected to memory system 202, video display 203, user input devices 204, and to acquisition devices 205, 206. Acquisition devices 205, 206 allow the computer system 200 to obtain digitized samples of sounds and images when desired by the user. As shown in FIG. 7, acquisition device 205 is an audio input such as a microphone, and acquisition device 206 is a video input such as a CCD camera or CMOS imager. Other well known acquisition devices may be used in computer system 200 as well.

Figures 1, 8A:
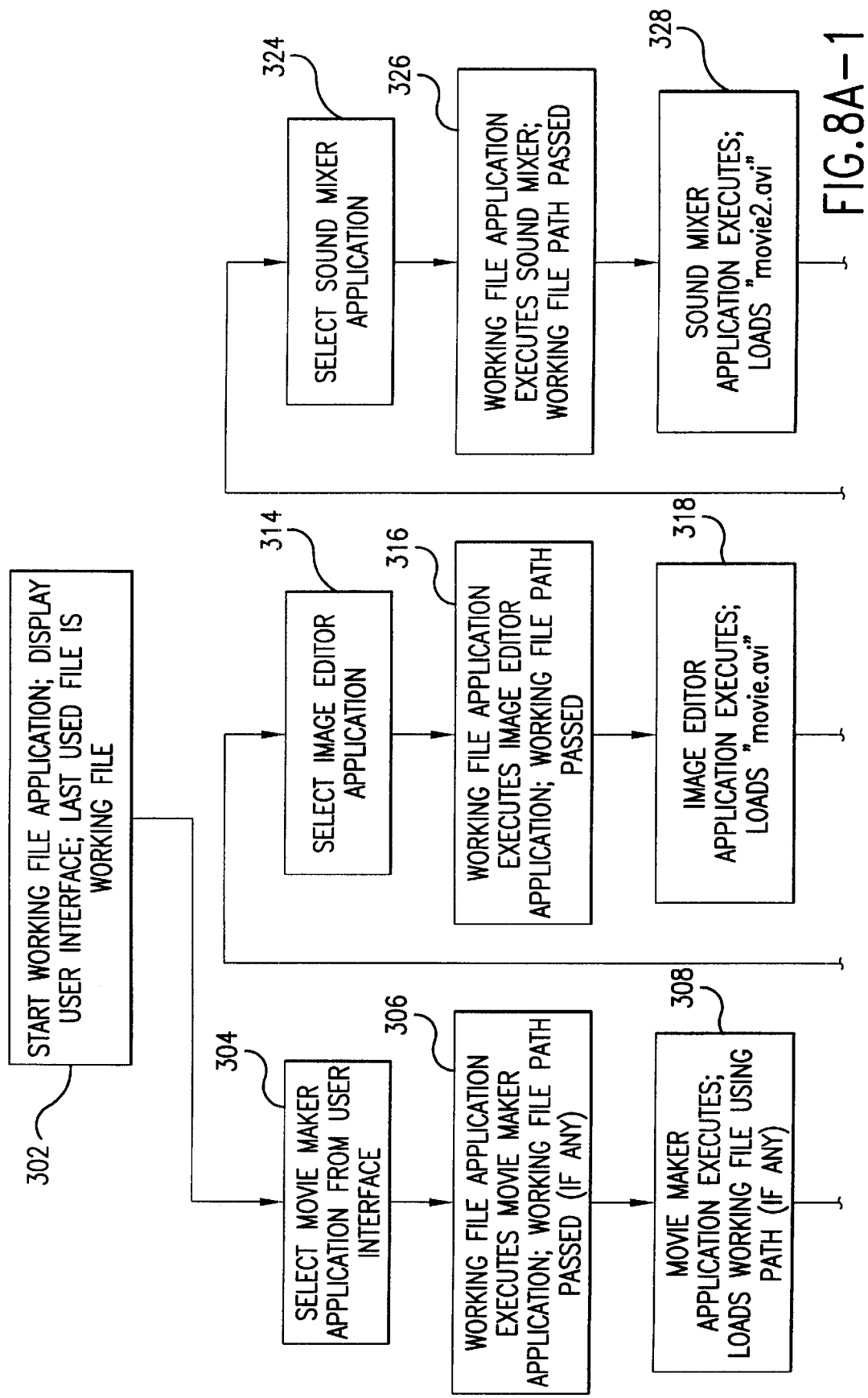
FIGS. 8a and 8b show a flow chart of an exemplary use of the second exemplary file sharing system according to the present invention.
Figure 8B:
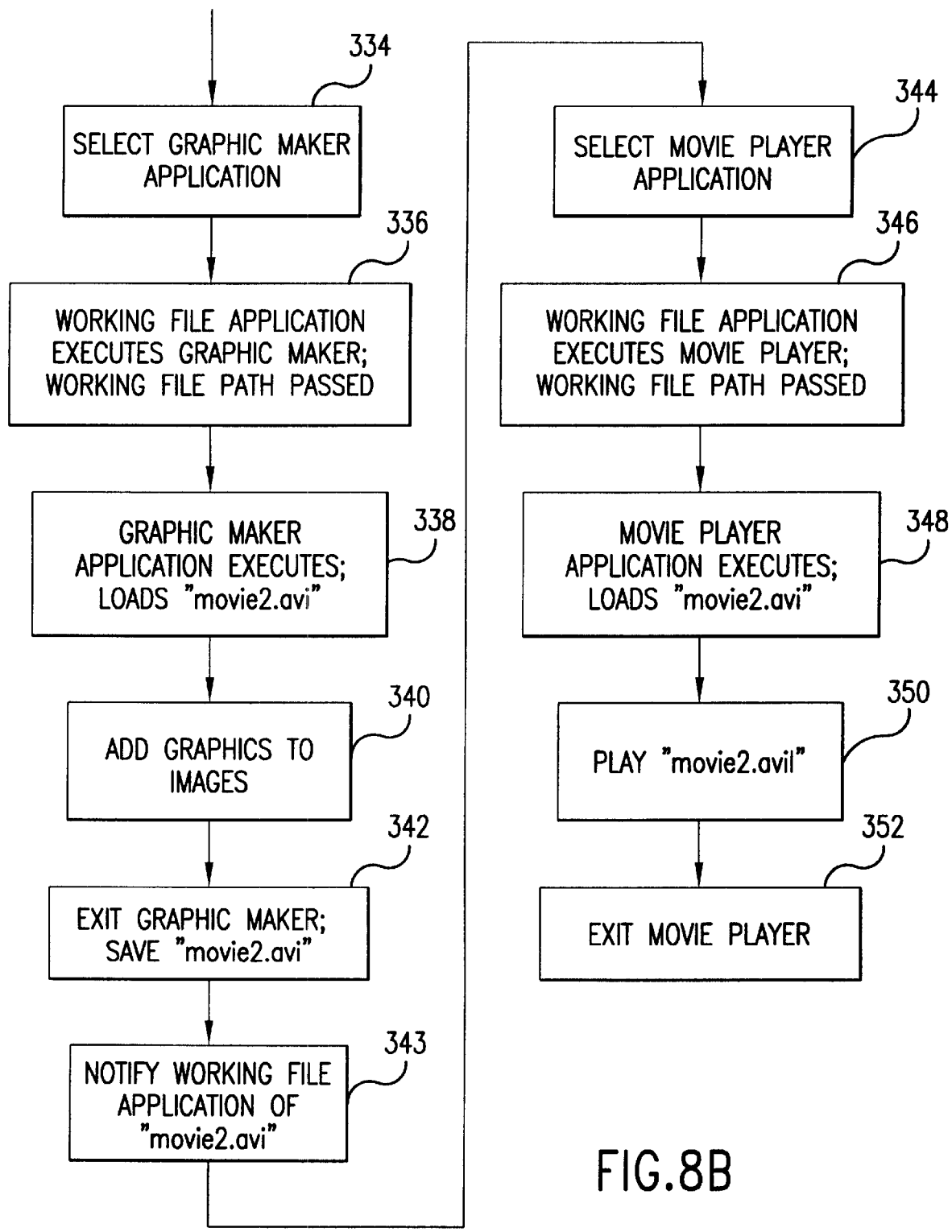

FIGS. 8a and 8b present a flow chart illustrating an example of the operation of the second exemplary embodiment according to the invention. This example will illustrate the creation of a movie clip using the working file application and the applications represented in the working file application's user interface 102. In step 302, the working file application is launched, and the computer system 200 displays the user interface 102 on the video display 203 (as shown in FIG. 6). The working file application sets as the working file the data file last being used as the working file (i.e., in a previous session). In this example, the data file "stills.bmp" is set as the working file. The gallery window 107 lists various data files associated with the multimedia applications suite ("stills.bmp," "soundsample.wav," and so forth), which may be selected as working files. The indicators 103 for each application are visible in the application area 104. The indicator 103c related to the sound mixer application has been signaled as incompatible with the working file (which is a bitmapped image file that does not support audio) through the use of an "X" through the indicator 103c. All other applications are available.

In step 304, one of the user input devices 204 is used to select the graphical indicator 103a, which represents the movie maker application. Upon selection of the indicator 103a, the user interface 102 executes the movie maker application (step 306) by sending the execution statement for the movie maker application to the operating system, along with the path for the working file "stills.bmp." The movie maker application is executed with the working file "stills.bmp" loaded for processing (step 308). The movie maker application may then be used to create a movie clip (step 310), using various known techniques. One such technique uses the acquisition devices 205, 206 to obtain a series of images (from the video input 206) and a series of sound samples (from the audio input 205) over a period of time. Alternatively, the movie maker may take images and audio from already created files and combine these into a movie clip. In this case, the user decides to start a new movie clip using multimedia data obtained from acquisition devices 205, 206.

Figure 9:
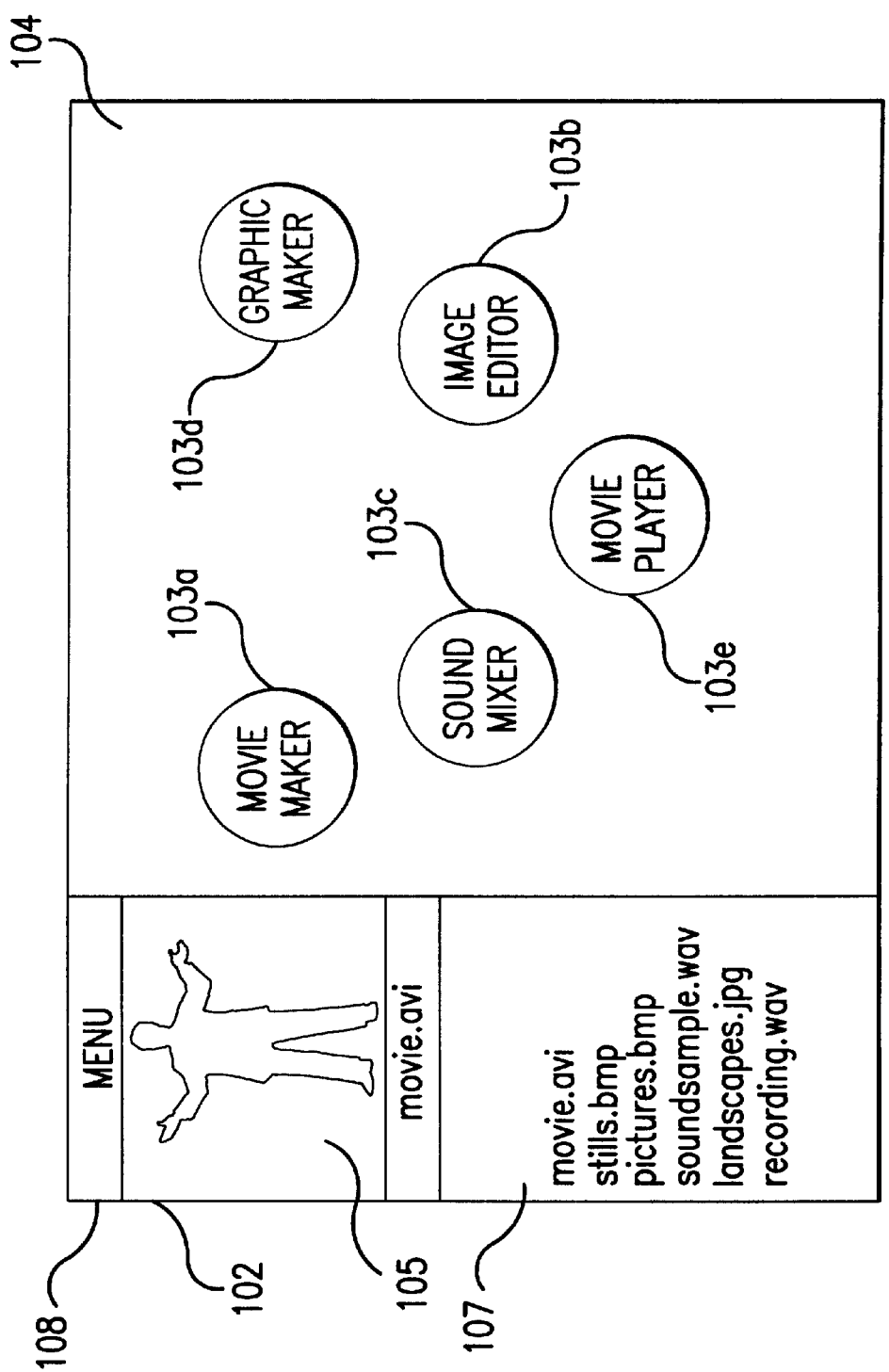
FIG. 9 shows a second diagram of a user interface of a second exemplary working file application according to the present invention.

Once the user has created the "unedited" movie clip using the movie maker application, the user saves the movie clip as a multimedia data file—in this example, the file is called "movie.avi" —and exits the movie maker application (step 312). The movie maker application notifies the working file application that the file saved was "movie.avi" and supplies the path for "movie.avi" to the working file application, for example, via a parameter passing facility between the movie maker application and working file application (step 313). Facilities of the operating system (e.g., messaging or notification services) may also be used. Accordingly, the working file application sets "movie.avi" as the working file and adds "movie.avi" to the gallery window 107 (as shown in FIG. 9). As shown in FIG. 9, indicator 103c related to the audio mixer application is no longer signaled as unavailable, since "movie.avi" is compatible with the sound mixing application.

In order to "clean up" the movie clip, the user may now run a collection of multimedia editing applications provided in the user interface 102. In step 314, the user launches the image editor application, for example, by using the user input devices 204 to select the indicator 103b from user interface 102. Since the "movie.avi" file is the working file, the working file application provides the execution statement for the image editor application to the operating system, along with the path for the "movie.avi" file (step 316). The image editor application is launched in over the application area 104 and the "movie.avi" file is loaded for processing (step 318). The user is then able to edit individual image frames of the video portion of the "movie.avi" movie clip using known image editing techniques (cropping, color correction, contrast adjustment, etc.), according to the functionality of the image editor application (step 320). Once the user has completed any desired editing, the edited data may be saved. The user may choose to save the edited data as the same file "movie.avi" (overwriting the previous data stored in that file) or may choose to save the edited data as a new file (in order to preserve the original data in "movie.avi"). In this example, the user chooses to save the edited data as a new file "movie2.avi," and exits the image editor application (step 322). The image editor application notifies the working file application that "movie2.avi" was the file saved, and the working file application sets "movie2.avi" as the new working file (step 323).

The user may also launch the sound mixer application (step 324), for example, by using the user input devices 204 to select the indicator 103c from the user interface 102. Since the "movie2.avi" file is the working file, the working file application provides the execution statement for the sound mixer application to the operating system, along with the path for the "movie2.avi" file (step 326). The sound mixer application is launched over the application area 104, and the "movie2.avi" file is loaded for processing (step 328). The user is now able to edit the soundtrack to the "movie2.avi" movie clip (for example, adding narration or background music), using the functionality of the sound mixer application (step 330). Once sound mixing is complete, the "movie2.avi" file is saved and the user exits the sound mixer application (step 332). The working file application is notified that "movie2.avi" was the file saved in the sound mixer application, and the working file application keeps "movie2.avi" as the working file (step 333).

The user may also launch the graphic maker application (step 334), for example, by using the user input devices 204 to select the indicator 103d. The "movie2.avi" file is still the working file, therefore the working file application will provide the operating system with the execution statement for the graphic maker application as well as the path of the "movie2.avi" file (step 336). The graphic maker application is launched over the application area 104, and the "movie2.avi" file is loaded for processing (step 338). The user is now able to insert graphics into the image frames of the movie clip (e.g., captions) using the functionality of the graphic maker application (step 340). Once complete, the "movie2.avi" file is saved and the user exits the graphic maker application (step 342). The graphic maker application sends a message to the working file application that "movie2.avi" is the file saved, and the working file application keeps "movie2.avi" as the working file (step 343).

Once processing is complete (or during processing in order to sample the present state of the movie clip), the user may launch the movie player application, for example, by using the user input devices 204 to select the indicator 103e (step 344). The "movie2.avi" file is still the working file, therefore the working file application will provide the operating system with the execution statement for the movie player application as well as the path of the "movie2.avi" file (step 346). The movie player application is launched over the application area 104, and the "movie2.avi" file is loaded (step 348). The user is now able to play the movie clip created using the previous processing steps (step 350). Once complete, the user exits the movie player application (step 352).

An additional feature that may be provided with the second example of the file sharing system described above is the inclusion of a separate application that allows for flexible data acquisition via the acquisition devices 205, 206. This acquisition application may be provided as part of the working file application or may be provided as a stand-alone application. In either case, the acquisition application is accessible via the user interface of the working file application to allow the user to execute the acquisition application.

Figure 10:
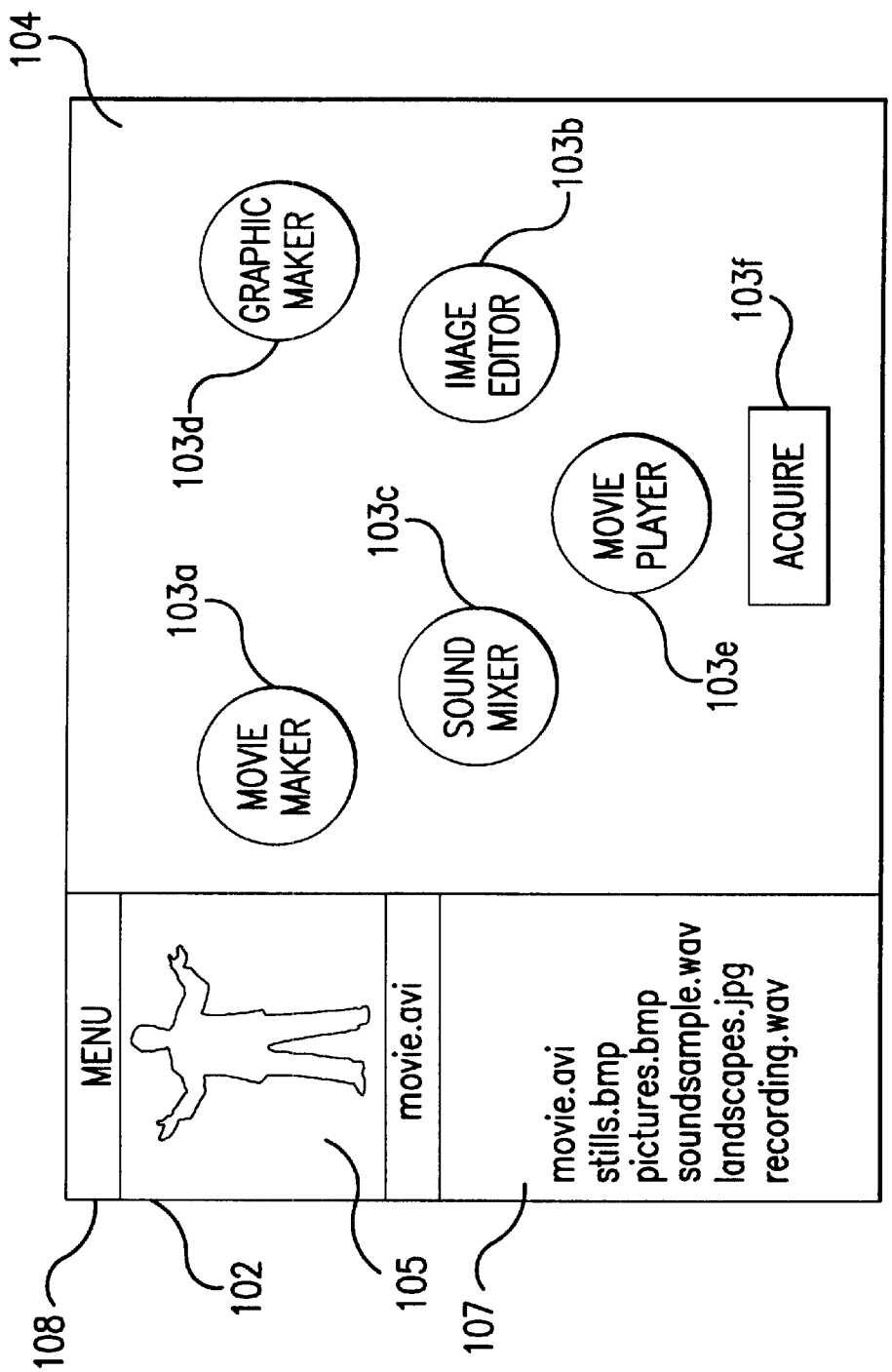
FIG. 10 shows a third diagram of a user interface of a second exemplary working file application according to the present invention.

FIG. 10 shows a view of a third exemplary user interface screen for the working file application, this user interface screen showing the inclusion of an acquisition application indicator 103f in the application area 104. A user may access the acquisition application by selecting the acquisition application indicator 103f using user input devices 204. Upon selection, the acquisition application is executed, allowing the user to acquire multimedia data from the acquisition devices 205, 206. Upon completion, the acquisition application allows the user to store the acquired data in a data file, and the path of this data file is provided to the working file application to set this file as the working file.

In addition, the user may choose to execute the acquisition application concurrently with other applications accessed through the working file application. For example, in the previous example of the operation of the exemplary working file application, the file "movie.avi" was created in the movie maker application (see FIG. 8a, step 310). Alternatively, after the movie maker application is executed, the user may select the acquisition application indicator 103f to cause the acquisition application to execute. The acquisition application may be used to obtain multimedia data and store this data to a data file, as described above. The path for this data file may then be provided to the working file application for installment as the working file, and may further be provided to the movie maker application (via the various passing facilities), such that the newly created data file may be loaded and processed using the movie maker application. The acquisition application thus provides a flexible acquisition tool.

As can be seen from the examples described above, the working file application may be used to manipulate files easily in a computer system, and particularly in a suite of related applications, without the need to keep track of the exact locations of the various files to be processed. The working file is provided to launched applications (when appropriate), since it is highly likely (particularly in a application suite) that the working file is the file desired to be operated on, thus saving time and preventing errors in record keeping.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A system, comprising:
    a data file stored at a location in a memory system and having a path to the location in the memory system, the data file being associated with at least one of a number of applications; and
    a working file application to automatically designate the data file as a working file and to provide the path of the working file to a selected one of the number of applications,
    wherein the working file application includes a user interface providing accessibility to the number of applications, the accessibility to be provided simultaneously with the designation of the data file in a first window as the working file and with a listing in a second window of remaining data files stored in the memory system, the remaining data files being associated with at least one of the number of applications, the first window and the second window being displayed simultaneously.

2. The system of claim 1, wherein the working file application stores the path of the working file.

3. The system of claim 1, wherein the user interface includes an indicator for each of the number of applications to allow a user to access at least one of the number of applications.

4. The system of claim 3, wherein at least one of the indicators for each of the number of applications includes a signal indicating the incompatibility of the application with the working file.

5. The system of claim 3, wherein the user interface includes a working file identifier for the working file.

6. The system of claim 5, wherein the user interface includes a working file window to display the working file identifier.

7. The system of claim 5, wherein the working file identifier includes at least one of a file name of the working file and a graphical view of the working file.

8. The system of claim 1, wherein the user interface includes a file library window to display identifiers for a number of data files.

9. The system of claim 8, wherein the working file application stores a respective path for each of the number of data files, and wherein a specified data file of the number of data files may be made into the working file by selecting the specified data file.

10. The system of claim 1, wherein the working file application further includes a feature to add or delete applications accessible via the user interface.

11. The system of claim 1, wherein the working file application is integrated with the number of applications.

12. The system of claim 1, wherein the number of applications comprise an application suite.

13. The system of claim 1, wherein the number of applications includes at least one multimedia application.

14. The system of claim 13, wherein the number of applications includes an acquisition application obtaining multimedia data and storing the multimedia data in an acquisition data file, and wherein the acquisition application provides a path of the acquisition data file to the working file application.

15. The system of claim 14, wherein the working file application provides storage of the path of the acquisition data file.

16. The system of claim 1, wherein the working file application includes a facility to provide drag tips during the dragging of a working file identifier for the working file in the user interface.

17. The system of claim 1, wherein the working file application uses parameter passing facilities to provide the path of the working file to the selected one of the number of applications.

18. The system of claim 17, wherein the parameter passing facility includes facilities provided by an operating system controlling execution of the working file application.

19. The system of claim 18, wherein the parameter passing facilities include command-line argument passing.

20. A method for file sharing, comprising:
    generating a listing in a first window of data files stored in a memory system, the data files being associated with at least one of a number of applications;
    receiving operations on one of the data files in a first of the number of applications, the data file stored at a first location in the memory system; storing the data file at a second location in the memory system;
    automatically designating the data file in a second window as a working file in response to a notification message from the first application;
    simultaneously displaying the first window and the second window;
    executing a second of the number of applications, wherein a path to the second location is automatically provided to the second application; and
    receiving operations on the working file in the second application.

21. The method of claim 20, further comprising:
    selecting the working file from a file library.

22. The method of claim 20, further comprising:
    displaying a user interface on a video display, the user interface including an indicator for the first application and an indicator for the second application.

23. The method of claim 22, wherein the step of executing the second application includes:
    receiving a selection of the indicator for the second application from the user interface;
    providing an execution statement for the second application to an operating system; and
    providing the path to the second location of the working file to the operating system for use by the second application.

24. The method of claim 20, further comprising:
    saving the path to the second location of the working file in order to provide the path to the second location of the working file to the second application.

25. The method of claim 20, wherein the first location and the second location are the same.

26. A method for file sharing, comprising:

generating a listing in a first window of data files stored in a memory system, the data files being associated with at least one of a number of applications;

automatically designating one of the data files in a second window as a working file;

providing a user interface that includes a number of application indicators, each of the application indicators related to one of the number of applications, and a working file identifier related to the working file;

simultaneously displaying the first window and the second window;

receiving a selection of one of the number of applications;

retrieving a path of the working file; and providing the path of the working file to the one of the number of applications that is selected.

27. The method of claim 26, further comprising:

retrieving an execution statement for the one of the number of applications that is selected;

providing the execution statement to an operating system to cause the execution of the one of the number of applications that is selected.

28. The method of claim 26, wherein the selection is from a selecting of one of the number of application indicators related to the one of the number of applications that is selected.

29. The method of claim 26, wherein the selection is from a dragging of the working file identifier to one of the number of application indicators related to the one of the number of applications that is selected.

30. The method of claim 29, further comprising:

providing drag tips during the dragging of the working file identifier.

31. The method of claim 26, further comprising:

providing a working file window in the user interface, wherein the working file identifier is displayed in the working file window.

32. The method of claim 26, further comprising:

providing an application area in the user interface, wherein the number of application indicators are displayed in the application area.

33. The method of claim 26, further comprising:

providing a file library window in the user interface, wherein a number of data file identifiers related to a number of data files are displayed in the file library window;

receiving a selection of one of the number of data files; and designating the selected one of the number of data files as the working file.

34. The method of claim 26, further comprising:

providing a control feature to allow the deletion of one of the number of application indicators.

35. The method of claim 26, further comprising:

providing a control feature to allow the addition of a new application indicator to the number of application indicators, the new application indicator related to a new application.

36. The method of claim 26, further comprising:

providing a signal indicating incompatibility of at least one of the number of applications with the working file.

37. The method of claim 26, further comprising:

providing an acquisition application indicator as one of the number of application indicators, the acquisition application indicator related to an acquisition application.

38. The method of claim 37, further comprising:

receiving a selection of the acquisition application;

obtaining multimedia data and storing the multimedia data in an acquisition data file via the acquisition application; and providing a path of the acquisition data file to the working file application.

39. The method of claim 38, further comprising:

storing the path of the acquisition data file; and setting the acquisition data file as the working file.

40. The method of claim 26, wherein the step of providing the path of the working file to the one of the number of applications that is selected includes using parameter passing facilities of an operating system.

41. The method of claim 40, wherein the parameter passing facilities include command line argument passing.

42. A storage medium, comprising:

a set of instructions which, when executed by a processor, perform:

generating a listing in a first window of data files stored in a memory system, the data files being associated with at least one of a number of applications;

automatically designating one of the data files in a second window as a working file;

providing a user interface that includes a number of application indicators, each of the application indicators related to one of the number of applications, and a working file identifier related to the working file;

simultaneously displaying the first window and the second window;

receiving a selection of one of the number of applications;

retrieving a path of the working file; and providing the path of the working file to the one of the number of applications that is selected.

43. The method of claim 26 further including receiving a selection of an alternative data file as the working file.

44. The method of claim 26 wherein the designating is in response to a notification message from an application.

45. The medium of claim 42 wherein the instructions further perform receiving a selection of an alternative data file as the working file.

46. The medium of claim 42 wherein the designating is in response to a notification message from an application.

* * * * *

UNITED STATES PATENT AND TRADEMARK OFFICE
CERTIFICATE OF CORRECTION

PATENT NO. : 6,567,825 B2
DATED : May 20, 2003
INVENTOR(S) : Douglas P. Bogia

It is certified that error appears in the above-identified patent and that said Letters Patent is hereby corrected as shown below:

Title page,
Illustrative figure, please change the word "SYNETHSIZER" to -- SYNTHESIZER --.

Drawings,
FIG. 3, please change the word "SYNETHSIZER" to -- SYNTHESIZER --.

Signed and Sealed this

Thirtieth Day of December, 2003

JAMES E. ROGAN
*Director of the United States Patent and Trademark Office*